J. H. HODDER.

WRITING-TABLET.

No. 7,170. Reissued June 13, 1876.

Witnesses:
L. L. Bond
C. W. Bond

John H. Hodder, Inventor.

N. PETERS, PHOTO-LITHOGRAPHER, WASHINGTON, D. C.

UNITED STATES PATENT OFFICE.

JOHN H. HODDER, OF AURORA, ILLINOIS.

IMPROVEMENT IN WRITING-TABLETS.

Specification forming part of Letters Patent No. 173,006, dated February 1, 1876; reissue No. 7,170, dated June 13, 1876; application filed May 27, 1876.

*To all whom it may concern:*

Be it known that I, JOHN H. HODDER, of Aurora, in the county of Kane and State of Illinois, have invented certain new and useful Improvements in Writing-Tablets; and I do hereby declare that the following is a full, clear, and exact description thereof, that will enable others skilled in the art to which it appertains to make and use the same, reference being had to the accompanying drawings, and to the letters of reference marked thereon, which form a part of this specification, in which—

Figure 1:
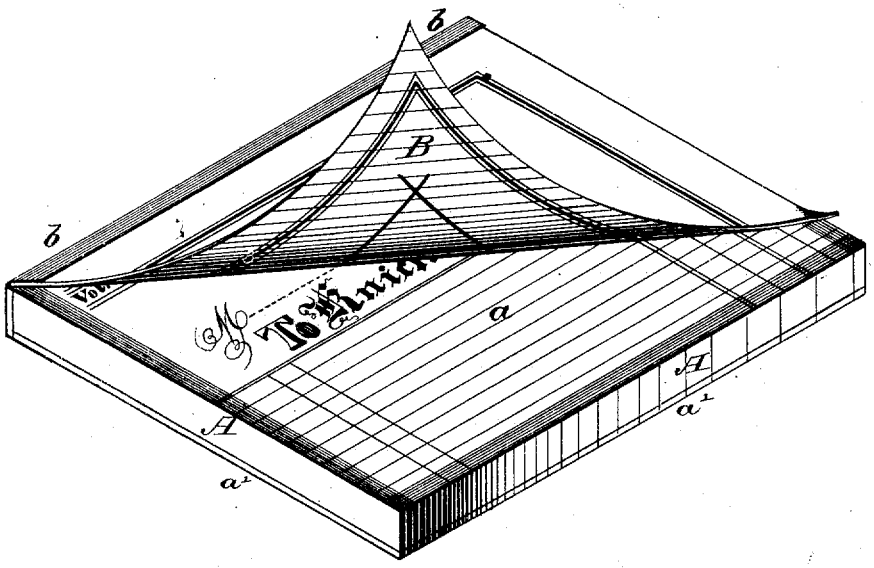
Figure 2:
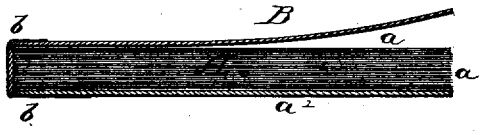

Figure 1 is a perspective, and Fig. 2 is a cross-section.

The design of my invention is to increase the efficiency and extend the use of writing-tablets or memorandum-blocks, in which a number of sheets of paper are secured together in the form of a block, and, when used, are capable of ready separation; and to this end it consists in combining, with a writing-tablet or memorandum-block, a cover or outer leaf, composed of absorbent or "blotting" paper, substantially as and for the purpose hereinafter specified.

In the annexed drawing, A represents a block or tablet composed of a number of sheets of paper, *a*, secured together at their edges in the usual ways, and, preferably, covered upon their lower side by a piece of heavy pasteboard, *a'*. The sheets thus secured together are in a convenient shape for use, and when the upper sheet is written upon it may be readily detached without disturbing the remainder.

When the tablet is used for letter-heads, bill-heads, receipts, &c., it is usually necessary that ink should be employed in filling out the same; and, in order that convenience may be afforded for readily drying the ink after writing, I attach to one edge of said tablet a cover or outer leaf, B, which is composed of absorbent or blotting paper, and may be turned backward so as to expose the whole surface of the upper blank, or may be turned downward upon the same, and caused to absorb the surplus ink of the writing contained by said blank.

The outer leaf or cover B not only operates as a blotter, but also serves to preserve the upper blank from being soiled when the tablet is not in use, and enables said tablet to be carried in a pocket without injury.

Having thus fully set forth the nature and merits of my invention, what I claim as new is—

As a new article of manufacture, a writing-tablet or memorandum-block, provided with a cover or outer leaf composed of absorbent or blotting paper, substantially as and for the purpose specified.

In testimony that I claim the foregoing I have hereunto set my hand this 16th day of May, 1876.

JOHN H. HODDER.

Witnesses:
F. W. JAMES,
O. B. KNICKERBOCKER.